US009165201B2

(12) United States Patent
Zhang et al.

(10) Patent No.: US 9,165,201 B2
(45) Date of Patent: Oct. 20, 2015

(54) SYSTEMS AND METHODS FOR DETECTING CELL PHONE USAGE BY A VEHICLE OPERATOR

(75) Inventors: Yeqing Zhang, Penfield, NY (US); Beilei Xu, Penfield, NY (US); Lalit K. Mestha, Fairport, NY (US); Graham Pennington, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 995 days.

(21) Appl. No.: 13/233,780

(22) Filed: Sep. 15, 2011

(65) Prior Publication Data
US 2013/0070957 A1  Mar. 21, 2013

(51) Int. Cl.
*G06K 9/32* (2006.01)
*G06K 9/00* (2006.01)

(52) U.S. Cl.
CPC .......... *G06K 9/3241* (2013.01); *G06K 9/00362* (2013.01); *G06K 9/3233* (2013.01)

(58) Field of Classification Search
None
See application file for complete search history.

(56) References Cited

U.S. PATENT DOCUMENTS

| | | | |
|---|---|---|---|
| 2005/0207643 A1* | 9/2005 | Lee et al. | 382/165 |
| 2007/0116365 A1* | 5/2007 | Kloer | 382/190 |
| 2007/0183663 A1* | 8/2007 | Wang et al. | 382/173 |
| 2010/0130182 A1* | 5/2010 | Rosen | 455/414.1 |
| 2011/0221926 A1* | 9/2011 | Kanaev et al. | 348/222.1 |
| 2011/0279682 A1* | 11/2011 | Li et al. | 348/169 |
| 2012/0015625 A1* | 1/2012 | Mendenhall et al. | 455/405 |

* cited by examiner

*Primary Examiner* — Sumati Lefkowitz
*Assistant Examiner* — Jhere Rowland
(74) *Attorney, Agent, or Firm* — MH2 Technology Law Group LLP

(57) ABSTRACT

An embodiment generally relates to systems and methods for determining cell phone usage automatically by individuals operating vehicles. A processing module can process multi-spectral images or videos of individuals and detect different regions in the image such as face regions, hand regions, and cell phone regions. Further, the processing module can analyze the regions based on locations and numbers of skin pixels and cell phone pixels to determine if the individual is holding his or her cell phone near his or her face. Based on the analysis, it can be determined whether the individual is operating the cell phone. Further, the analysis can yield a confidence level associated with the cell phone usage.

16 Claims, 7 Drawing Sheets

SYSTEMS AND METHODS FOR DETECTING CELL PHONE USAGE BY A VEHICLE OPERATOR

FIELD OF THE INVENTION

This invention relates generally to imaging systems and, more particularly, to systems and methods for detecting cell phone usage by a vehicle operator.

BACKGROUND OF THE INVENTION

As cellular phones and other mobile devices have become increasingly prevalent and used more widely, vehicle drivers or operators have increasingly used the phones and devices while driving vehicles. It is well known that cell phone usage by a vehicle driver can distract the driver's attention and can lead to accidents, speeding, and other negative effects. In fact, reports exist of a strong association between traffic accidents and cell phone usage. For these reasons, jurisdictions in some countries have prohibited the use of cell phones while driving a vehicle, with or without a hands-free device.

It can be difficult to detect cell phone usage by a driver without a human, such as a law enforcement officer, explicitly seeing the driver using the cell phone. However, because law enforcement officers cannot be positioned at a large number of surveillance positions, and because the law enforcement officers will not always be looking for cell phone usage, there can be a lot of cell phone usage by vehicle operators that can go unnoticed. As a result, traffic accidents caused by cell phone usage can remain prevalent.

Therefore, it may be desirable to have systems and methods for the automatic detection of cell phone usage by vehicle operators. In particular, it may be desirable to use imaging techniques to perform material and object classification to make a robust detection of cell phone usage by vehicle operators.

SUMMARY

An embodiment pertains generally to a method of processing data. The method comprises processing data comprising an image or a video of an individual operating a vehicle. The processing comprises analyzing the data to identify skin pixels and cell phone pixels within the image or the video based on a set of material characteristics. The processing further comprises performing a facial detection technique on the data to identify a facial region comprising a portion of the skin pixels, identifying a region of interest (ROI) in a proximity to the facial region, analyzing an additional portion of the skin pixels and the cell phone pixels within the ROI, and determining whether the individual is using a cell phone based on the analysis of the additional portion of the skin pixels and the cell phone pixels.

Another embodiment pertains generally to a system for processing data. The system comprises a capture device configured to capture data comprising an image or a video of an individual operating a vehicle. The system further comprises a processor coupled to the capture device and configured process the data. The processing comprises analyzing the data to identify skin pixels and cell phone pixels within the image or the video based on a set of material characteristics. The processing further comprises performing a facial detection technique on the data to identify a facial region comprising a portion of the skin pixels, identifying a region of interest (ROI) in a proximity to the facial region, analyzing an additional portion of the skin pixels and the cell phone pixels within the ROI, and determining whether the individual is using a cell phone based on the analysis of the additional portion of the skin pixels and the cell phone pixels.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
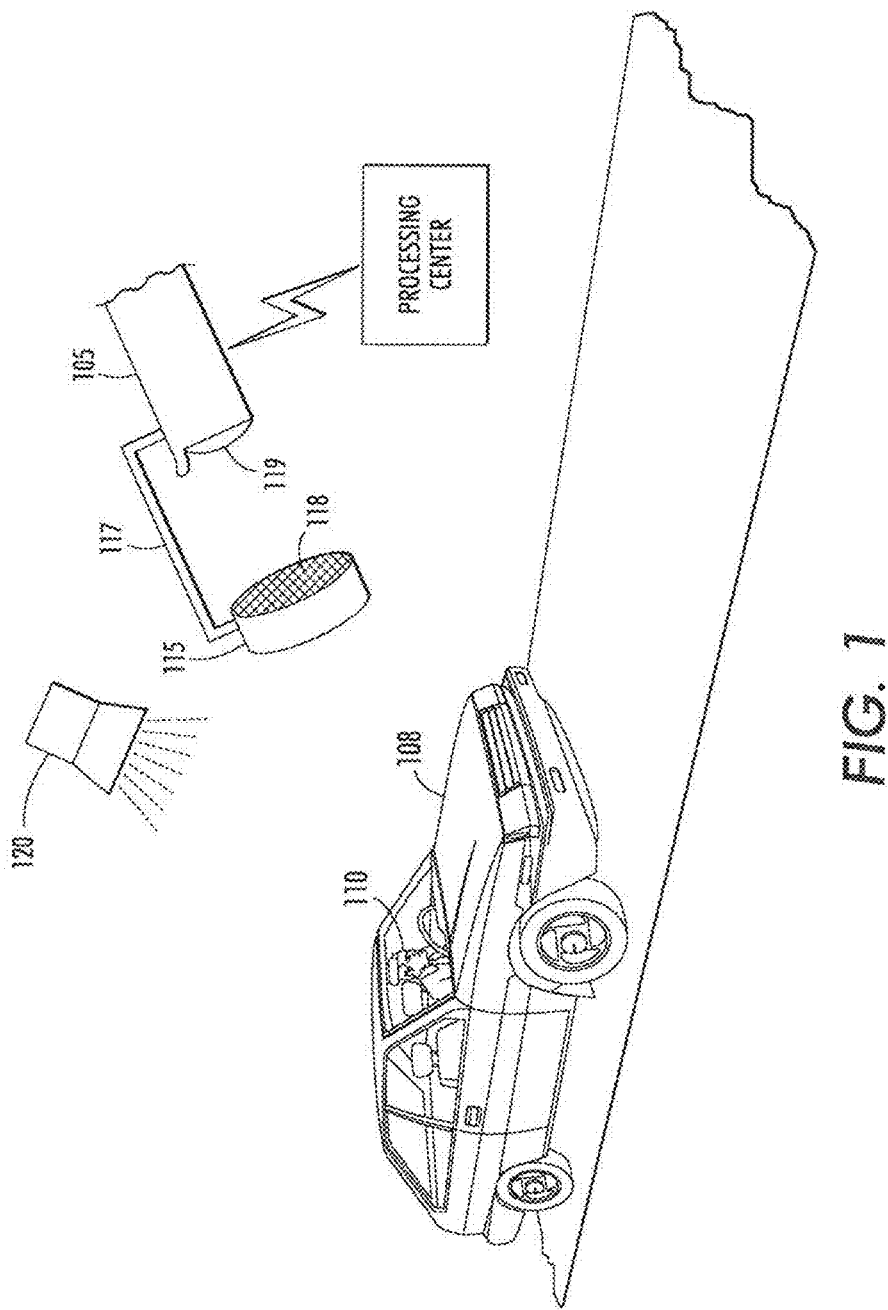
FIG. 1 illustrates an exemplary environment depicting an image capture device and associated components, in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Embodiments as described herein generally relate to systems and methods for detecting cell phone usage by a vehicle driver or operator. In particular, the systems and methods can comprise a processing module or similar logic that can be configured to perform multi-spectral imaging techniques to classify materials and objects in detecting cell phone usage by the vehicle operator. It should be understood that the systems and methods as described herein can be applied to or otherwise implemented in other fields such as, for example, traffic enforcement, such as high occupancy vehicle (HOV) lanes and high occupancy toll (HOT) lanes; red-light detections; and other services.

According to embodiments, images or videos of the vehicle driver in a moving vehicle can be captured using, for example, a simultaneous multi-spectral imager. The image data can be processed into an image data cube or a sequence of data cubes, which can be developed and processed to detect cell phone usage by the vehicle driver. In particular, an image of a frontal view of the vehicle and/or the driver can be captured, and the image can undergo a simultaneous spectral decomposition of multiple wavelength bands. A skin pixel classification and a cell phone material pixel classification can be performed on any and all multi-spectral images using, for example, subspace projection techniques. A face recognition technique can be performed on one of the multi-spectral images, and the hand/skin pixels as well as the cell phone material pixels can be identified in defined windows surrounding the face region. Further, a relative position of the hand/skin pixel blob and the cell phone pixel blob in relation to the face region can be estimated to make a decision about whether the vehicle driver is using a cell phone.

According to embodiments, the systems and methods as described herein can utilize multi-spectral skin detection technology in a wavelength range of, for example, 900 nanometers (nm) to 2400 nm, or other ranges. Human skin can reflect certain wavelengths of light differently than reflections by fabric polymers or other types of materials in the near infrared (NIR) range. Therefore, by capturing image data cubes at multiple wavelengths simultaneously, analysis techniques can accurately classify skin objects even through, for example, a glass windshield, an oxygen mask placed over a patient's face, and other objects. Further, the multi-spectral image processing techniques can be used to detect skin blobs within a wavelength band of interest, and process the skin blobs to determine or estimate whether a vehicle driver is using a cell phone. Still further, the multi-spectral image processing techniques can be used to distinguish skin blobs of an individual, such as face skin blobs or hand skin blobs, from materials associated with cell phones such as, for example, plastic, metal, rubber, and other materials.

According to embodiments, the systems and methods comprise functionality to capture multi-spectral or multi-bandwidth images of individuals. As shown in FIG. 1, depicted is an exemplary environment 100 configured to capture multi-spectral images of individuals operating vehicles. The environment 100 can comprise a capture device 105 such as, for example, a camera or other imaging device, that can be used to capture images at varying wavelength bands. For example, the capture device 105 can be a traffic camera that can be positioned near an intersection, tollbooth, roadway, or other location from which the capture device 105 can capture images of vehicle operators. According to embodiments, the capture device 105 can be configured to capture images of an individual 110 that can be operating a vehicle 108. In embodiments, a lens-filter combo 115 & 118, such as that with a normal lens structure and a filter grid with different filter material to accomplish multi-spectral imaging capability for simultaneous capture, can be positioned along the optical axis of the capture device 105, or in other locations, and can be used to filter the image of the individual 110 before receipt by the capture device 105. It should be appreciated that other configurations and positionings of the capture device 105, filter 115, individual 110, and vehicle 108 are envisioned. The multiple filter grid can be assembled on to the detector array of the capture device.

The lens-filter combo 115 & 118 can be reversed with the filter 118 placed before the lens 115 along the optical axis of the lens 115 and the lens 115 positioned close to the capture device 105. Further, the lens 115 on the capture device 105 can be a honeycomb lens with a multiple filter grid of the type designed using the Fabry-Perot method and directly mounted in front of the capture device 105. The honeycomb lens structure, when positioned on the capture device 105 along the optical axis after the multiple filter grid, can direct dispersed light components onto a two dimensional (2D) detector array in the capture device 105. Further, the lens-filter combo 115 & 118 may or may not be required in this type of embodiment, as the capture device 105, with its multiple filter grid and honeycomb lens, can provide a needed optical path and desired transmission of wavelengths onto the detector array.

According to embodiments, each grid on the multiple filter grid 118 can be tuned to filter the incoming image at a specified wavelength. For example, one filter on the grid 118 can filter the image at 800 nm, another one at 850 nm, another one at 900 nm, another one at 1000 nm, another one at 1450 nm, and so on. It should be appreciated that various combinations of the number of filters in the grid 118 and the filter wavelengths of the filters are envisioned and can be assembled based on various needs. Further, it should be appreciated that other filtering components and elements to capture multi-bandwidth images are envisioned. Still further, the wavelengths of the grid 118 can be set or adjusted to capture light from various ranges such as infrared, visible, ultraviolet, and other ranges. In embodiments, the multiple filter grid 118 can be tunable or of a fixed wavelength, whereby the tunability can be obtained by, for example, actuating a gap between a Fabry-Perot interferometer, or adjusting other devices or controls of the multiple filter grid 118 and/or other components.

In some embodiments, the multiple filter grid 118 can be connected to the capture device 105 via a connector 117, or other components. However, it should be appreciated that the multiple filter grid 118 can be located in other positions, such as, for example, affixed to a lens 119 of the capture device 105. In other embodiments, an illuminator 120 or similar device can be used to provide enough illumination in the visible or infrared wavelength bands of the capture device 105.

As shown in FIG. 1, the environment can further comprise a processing center 125 that can comprise components, resources, and elements that can perform functions and execute applications related to the processing of imaging data and other data. The processing center 125 can be connected to the capture device 105 via a wired, wireless, or other network connection. In embodiments, a memory card or similar storage device with image data can be connected to resources of the processing center 125. It should be appreciated that other data access and transfer techniques are envisioned. In embodiments, the processing center 125 can be configured with any necessary hardware or software to process the image data in accordance with the functionality as described herein.

Figure 2A:
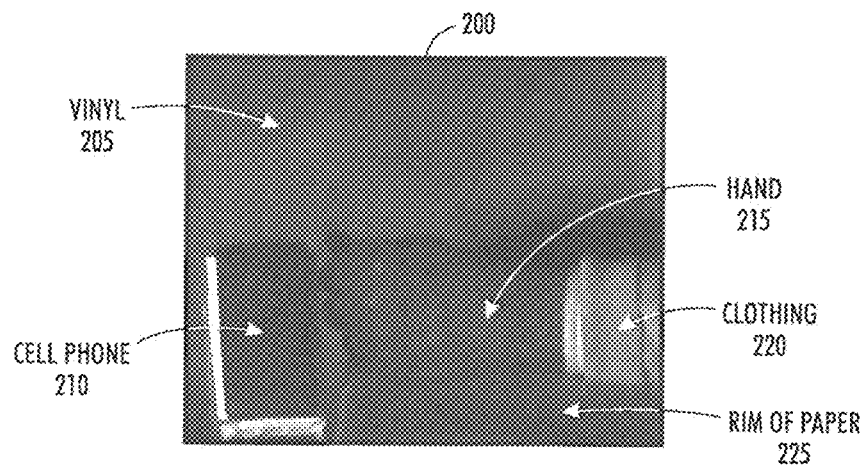
FIG. 2A illustrates an exemplary image, in accordance with embodiments.

According to embodiments, the capture device 105 can be configured to capture two-dimensional images of the individual 110. In embodiments, the images can be still or video images. In embodiments, the capture device 105 can capture different views of the individual 110 such as, for example, side views, front views, and other views. The capture device 105, or other processing applications or devices, can decompose a captured image into its spectral bands to form a data cube. For example, FIG. 2A is an image 200 that was captured at a filter wavelength band of 1650 nm. Further, the image depicted in FIG. 2A was one of nine (9) images captured, in a lab environment, through a windshield and through multi-spectral filters ranging from 1000 nm to 1650 nm.

Figure 2B:
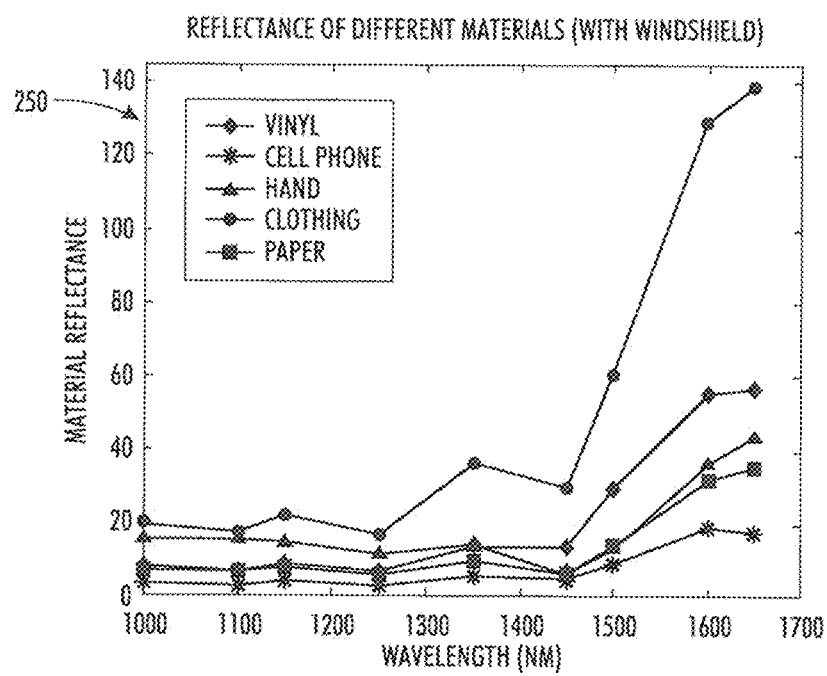
FIG. 2B illustrates an exemplary processing output, in accordance with embodiments.

As shown in FIG. 2A, the 1650 nm wavelength image 200 comprises depictions of various objects, items, and materials. For example, as shown in FIG. 2A, the image 200 comprises depictions of vinyl 205, a cell phone 210, a hand 215 of an individual, clothing 220, and a rim of paper 225. One viewing the image 200 can distinguish the objects, items, and materials from each other. Referring to FIG. 2B, illustrated is a reflectance plot 250 of various materials and objects that were included in the nine images captured in the lab environment, including the image 200, as shown in FIG. 2A.

As shown in the reflectance plot 250, the material reflectance, in digital counts, for each of the materials and objects (vinyl, cell phone, hand, clothing, and paper), at each of the nine wavelengths, are plotted. When maximum reflected light occurs, the material reflectance will be 255 digital counts. Further, as generally shown in the reflectance plot 250, as the wavelengths increase, the difference in reflectance among the skin pixels, the cell phone pixels, and other material pixels increases. For example, in the 1100 nm wavelength image, the difference in material reflectance among the materials and objects is, roughly, less than 20. However, in the 1650 nm wavelength image, the cell phone has a material reflectance of about 140, the vinyl has a material reflectance of about 58, and the hand has a material reflectance of about 42, with the values shown in 8-bit digital counts. That is, in the 1650 nm wavelength image, there is a substantial difference in material reflectances among the materials and objects. As a result, the substantial difference can enable a detection and classification of skin pixels and cell phone pixels in a multi-spectral image of the vehicle operator.

According to embodiments, a principal component analysis (PCA) technique can be use to analyze multi-spectral images to classify materials and objects. However, it should be appreciated that other image analyses can be used to classify materials in images such as, for example, linear discriminant analysis (LDA) or independent component analysis (ICA). PCA is a subspace projection technique that can be used to re-project an original data matrix with a smaller set of uncorrelated and optimal variables in a least mean square error sense. Further, the PCA technique can be used to identify patterns in data, and express the data in such a way as to highlight similarities and differences. Further, the PCA technique can be used to compress data by reducing the dimension of the data.

According to the PCA technique, basis vectors can be obtained by solving the algebraic eigenvalue problem:

$$R^T(XX^T)R=L \tag{1}$$

In equation (1), X is a data matrix with columns that can be training samples, R is a matrix of eigenvectors, and L is a corresponding diagonal matrix of eigenvalues. Further, a projection of data can be defined as:

$$C_n=R_n^T X \tag{2}$$

In embodiments, the projection of data from the original p dimensional space to a subspace spanned by n principal eigenvectors can be optimal in the mean squared error sense. That is, the re-projection of $C_n$ back into the p dimensional space can have minimum reconstruction error. Further, if n is large enough to include all the eigenvectors with non-zero eigenvalues, then the re-projection can be lossless. Assuming that each of the multi-spectral images is at a dimension of l×j and that there are, in total, N multi-spectral images filtered at N different wavelengths, then the multi-spectral images can be expressed by an M×N data matrix $Y_{M \times N}$, wherein M=l×j. In embodiments, a singular value decomposition can be performed on $Y_{M \times N}$ as follows:

$$Y_{M \times N}=U*S*V' \tag{3}$$

In equation (3), S is M×N, U*U'=1, and V*V'=1. That is, U and V can have orthonormal columns. In embodiments, $Y_{M \times N}$ can be approximated by taking the first b columns of U:

$$Y_{M \times N}^{app}=U(1:M,1)*W(1,1:N)+U(1:M,2)*\\W(2,1:N)+\ldots+U(1:M,b)*W(b,1:N) \tag{4}$$

In equation (4), $W_{b \times N}$ are eigenvalues wherein $W_{b \times N}$=S(1:b,1:b)*V(1:N,1:b)', and U(1:M,b) are the eigenvectors. In embodiments, before the PCA analysis, an image registration can be performed among the multi-spectral images to compensate for any spatial shift in the x or y directions, or angular shift between the multi-spectral images such that the images are spatially aligned with each other. Further, a robust image registration can help to achieve accurate material classification with a PCA analysis of the multi-spectral images.

Figure 3A:
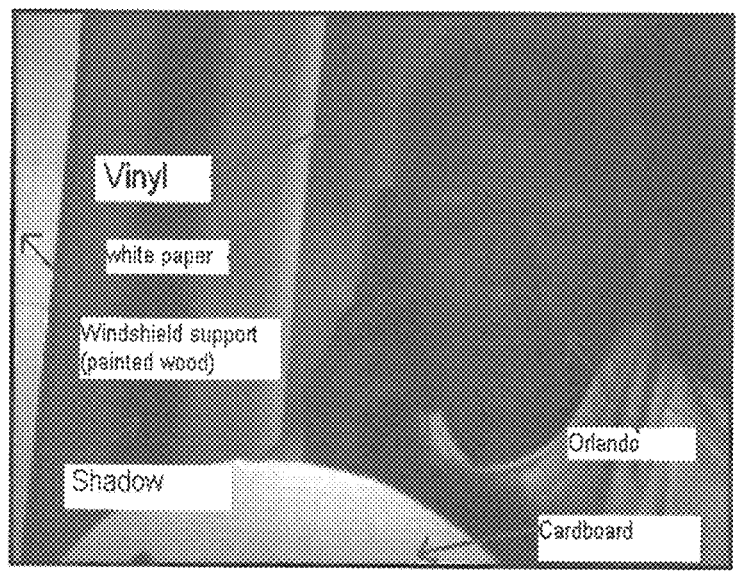
FIG. 3A illustrates an exemplary image, in accordance with embodiments.
Figure 3B:
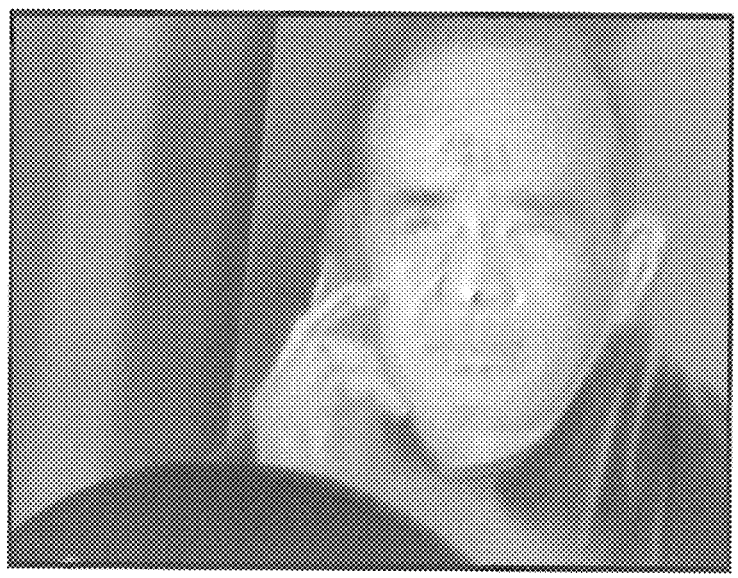
FIG. 3B illustrates an exemplary processed image, in accordance with embodiments.
Figure 3C:
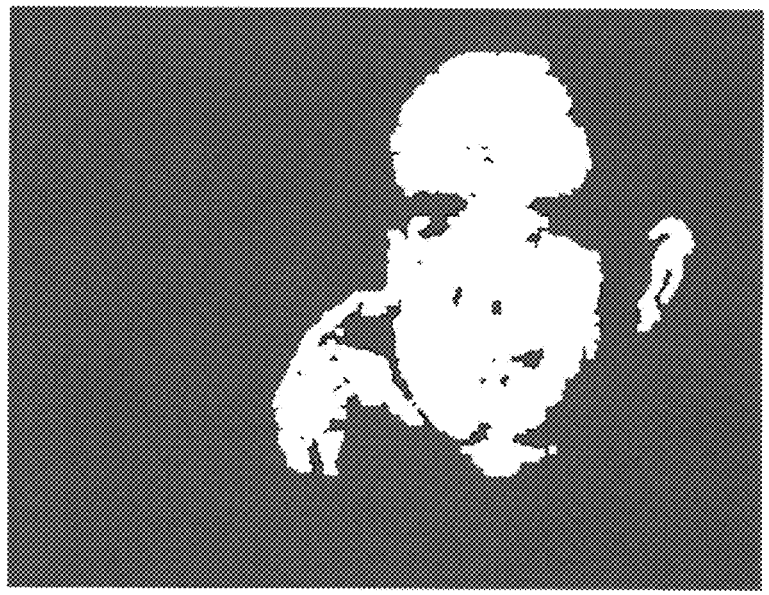
FIG. 3C illustrates an exemplary processed image, in accordance with embodiments.

Referring to FIG. 3A, depicted is an exemplary image, taken at a wavelength of 1650 nm through a vehicle windshield, of a vehicle operator talking on a cell phone from the driver's seat. As shown in FIG. 3A, the image comprises indications of various materials, sections, and objects, including vinyl, white paper, windshield support, a shadow, a driver, and cardboard. Referring to FIG. 3B, depicted is a reconstructed image of the image of FIG. 3A using the first PCA eigenvector. In embodiments, when the reconstructed image of FIG. 3B is analyzed and compared with a skin pixel threshold, the skin pixels are shown as white pixels in the after-thresholding binary image, as depicted in the image of FIG. 3C. More particularly, one of more sections of the reconstructed image of FIG. 3B can be identified as skin, and those one or more sections are shown as white pixels after thresholding. Further, a collection of connected skin pixels can form a skin blob through, for example, a connect-component analysis.

Figure 3D:
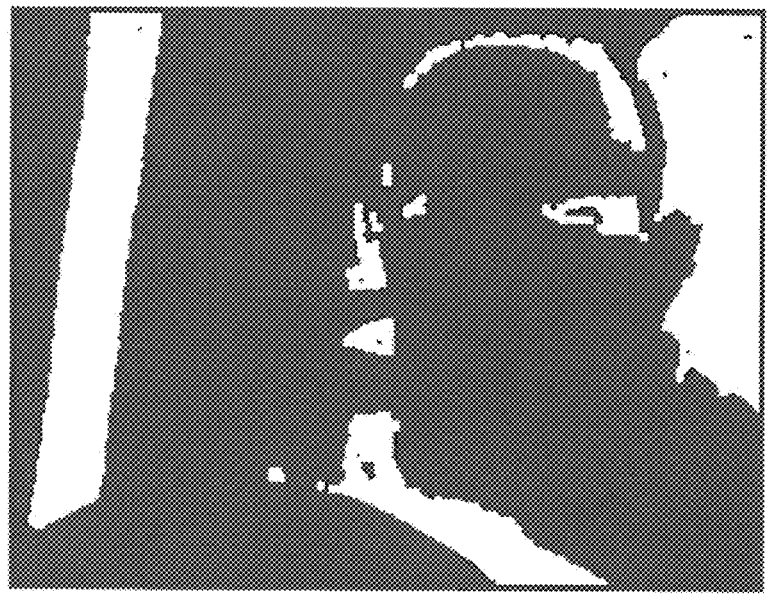
FIG. 3D illustrates an exemplary processed image, in accordance with embodiments.

In further embodiments, when the reconstructed image of FIG. 3B is analyzed and compared with a threshold of cell phone material, then the identified cell phone pixels can be shown as white pixels in the binary image after thresholding, as depicted in the image of FIG. 3D. More particularly, one of more sections of the reconstructed image of FIG. 3B can be identified as depicting a cell phone, and those one or more sections can be shown as white pixels after thresholding. As shown in FIG. 3C, the skin pixel classification is relatively accurate, however, the cell phone pixel classification as shown in FIG. 3D shows some sections of false positive pixels. In particular, the windshield support and some of the shadows are also detected as cell phone pixels in FIG. 3D. As such, an object recognition technique can be used to further discern cell phone usage by drivers. It should be appreciated that any type or combination of object recognition techniques are envisioned. For example, the skin blob and cell phone blob detection processes, as discussed herein, do not necessarily need to be performed on the same reconstructed PCA images. Instead, the skin blob and cell phone blob detection processes can be performed on multiple PCA images, in any combination.

According to embodiments, once the materials and objects of an image are classified, the systems and methods as defined herein can be configured to detect faces of individuals in the images. In particular, if an individual is directly talking on a cell phone, the individual can hold the cell phone right next to his/her ear or face. As such, a blob of cell phone pixels and a blob of hand skin pixels adjacent to or in proximity of the face region can be a strong indication that the individual is using the cell phone. Further, detecting the spatial location of the individual's face can help to locate the blob of cell phone pixels and the blob of hand skin pixels adjacent to, or in proximity of, each other.

In embodiments, face detection can be performed on one or more of the captured multi-spectral images. For example, the face detection can be performed on an image with a high image contrast such as the image from the filter at a high wavelength band. Once the image is chosen, a face detection algorithm can be applied to the image to detect a facial region. For example, as shown in FIG. 4, the detected face region is outlined by a center window 405. It should be appreciated that any face detection algorithm, or combination of face detection algorithms, can be applied to the image. For example, the facial location in relation to the windshield (e.g., either the left side or the right side) can be used to indicate if the detected face is that of a driver or a passenger.

Figure 4A:
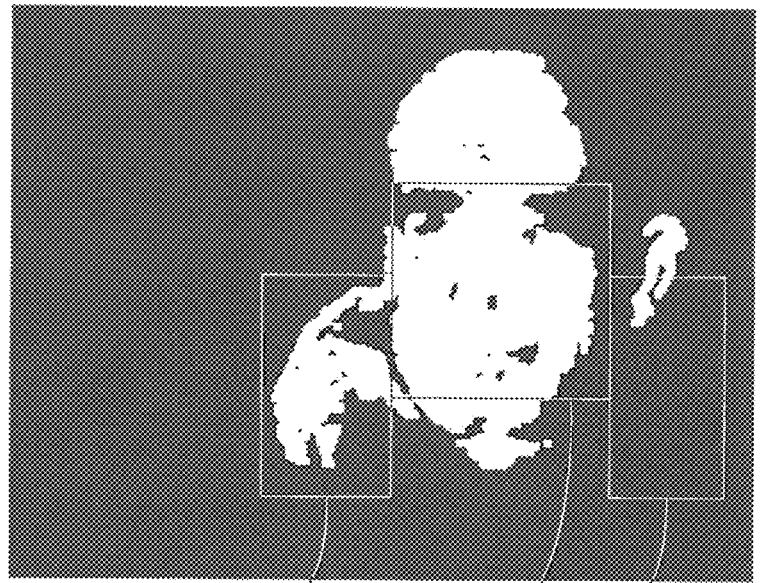
FIG. 4A illustrates an exemplary processed image, in accordance with embodiments.

After the face region is detected, the processing module or other logic can locate and/or generate regions-of-interest (ROI's) adjacent to or in proximity to the face region. In particular, when analyzing or processing the image, ROI's can be identified on both sides of the face region. Referring to FIG. 4A, there are two side ROI's 410, 415 that are adjacent to the center window 405. Further, the skin pixels in the side ROI's 410, 415 on both sides of the face region can be counted, numbered, and/or the like. If the number of skin pixels in either of the side ROI's 410, 415 meets or exceeds a pre-defined threshold $T_{hand}$, then the processing module can deem the existence of a hand next to the face in that particular side ROI. For example, if the pre-defined threshold $T_{hand}$ is 275 pixels, and the number of skin pixels in the left side ROI 410 is 280 pixels, then the processing module can deem that the driver's hand is next to the driver's face. It should be appreciated that other threshold values, conditions, combinations, and the like are envisioned. Further, it should be appreciated that the location and size of the side ROI's 410, 415 can vary. For example, the location and size of the side ROI's 410, 415 can be made proportional to the size of the face region.

In operation, referring again to FIG. 4A, the left side ROI 410 comprises skin pixels that depict a hand next to the face of the individual. If the number of skin pixels in the left side ROI 410 meets or exceeds the threshold, then the processing module or other logic can deem that there is a hand next to a face of the vehicle driver.

Figure 4B:
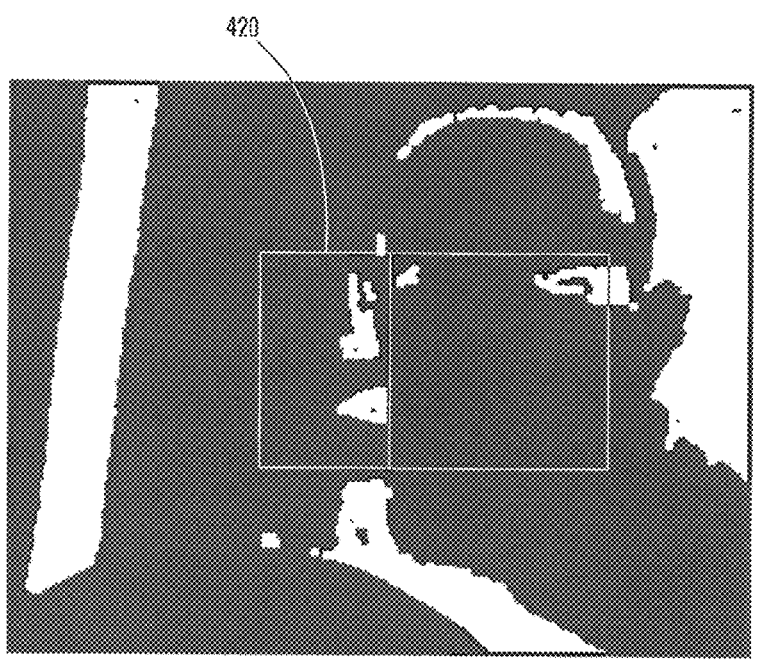
FIG. 4B illustrates an exemplary processed image, in accordance with embodiments.

If a hand is detected or deemed next to the face region, the processing module or other logic can count the number of cell phone pixels in the window on the same side of the face where the hand is detected. For example, if a hand is detected in a window to the left of the face window, then the processing module can count the number of cell phone pixels in the left window. As shown in FIG. 4B, the cell phone pixels in a left ROI 420 are depicted as white pixels. If the number of cell phone pixels in the corresponding window meets or exceeds a pre-defined threshold $T_{cellphone}$, then the processing module can deem the existence of a cell phone next to the face. It should be appreciated that other threshold values, conditions, combinations, and the like are envisioned.

In embodiments, if both a hand and a cell phone are deemed to be next to the face region, then the processing module or other logic can deem the existence of a violation by the driver. Further, in embodiments, multiple image frames can be used to confirm violations. For example, if a violation is detected in more than a set number of image frames, then this can be an accurate indication that the driver is engaged in a continuous phone conversation. In embodiments, the processing module or other logic can mark violations with an indication of a confidence level. For example, the processing module can attach a low or high confidence level to a detected violation. It should be appreciated that other confidence marking techniques are envisioned. Further, if a high confidence level is attached to a violation, then a ticket or citation can be automatically issued. Still further, if a low confidence level is attached to a violation, then the analysis data can be routed to human operators for visual confirmation.

Figure 5:
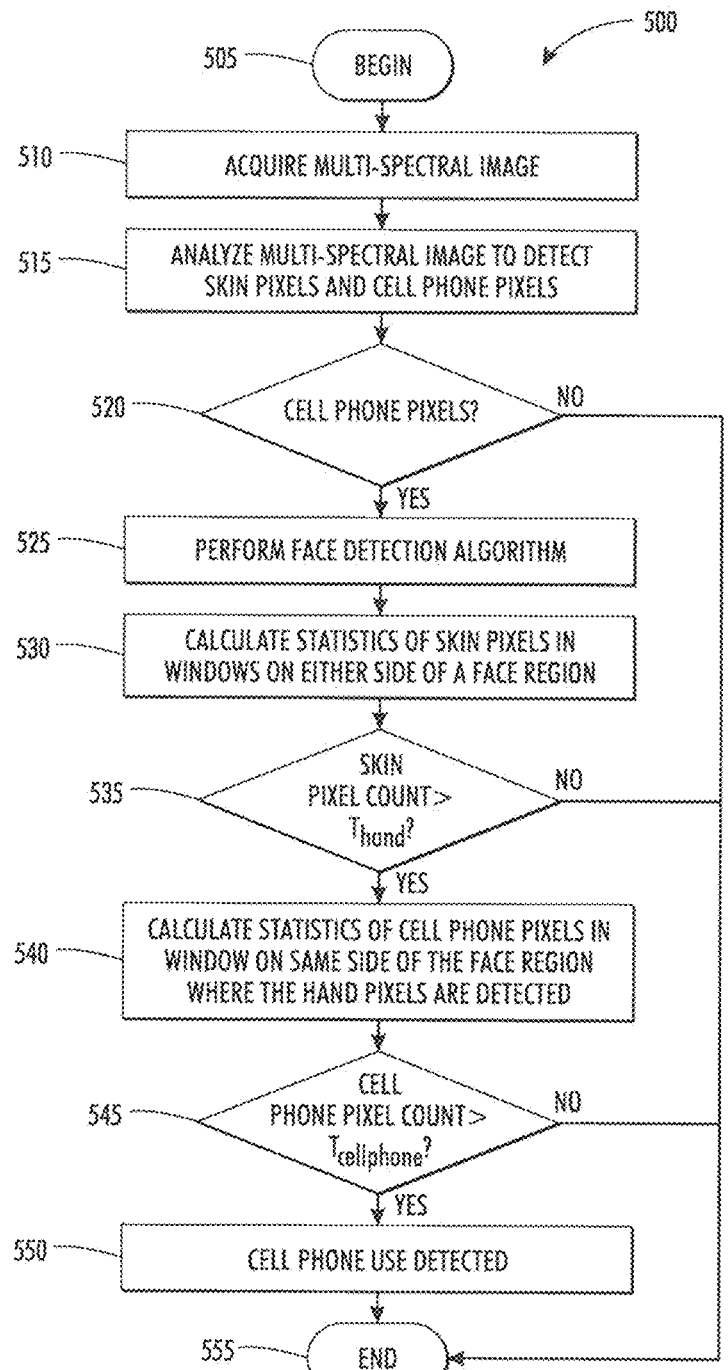
FIG. 5 illustrates an exemplary flow diagram of processing data in accordance with another embodiment.

Referring to FIG. 5, depicted is a flowchart detailing a technique 500 used to detect cell phone usage by a vehicle driver. It should be readily apparent to those of ordinary skill in the art that the flow diagram depicted in FIG. 5 represents a generalized illustration and that other steps can be added or existing steps can be removed or modified.

In 505, processing can begin. In 510, a multi-spectral image or video of a vehicle driver can be captured or acquired. In embodiments, the multi-spectral image can comprise multiple wavelength bands ranging from, for example, 900 nm to 2400 nm. In 515, the multi-spectral image can be analyzed to detect skin pixels and cell phone pixels. In embodiments, one specific wavelength image of the multi-spectral image can be analyzed. In other embodiments, the pixel determinations can be made according to a PCA analysis.

In 520, the processing can determine whether there are any cell phone pixels in the analyzed image. If there are no cell phone pixels, then processing can proceed to 555 in which processing can end, repeat, or return to any of the previous steps. If there are cell phone pixels, then processing can proceed to 525 in which a face detection algorithm can be performed on the image. In embodiments, any technique, processing, or algorithm can be used to detect the positioning or existence of pixels associated with a face. In 530, statistics associated with skin pixels in windows on either side of the face region can be calculated. In some embodiments, the face detection algorithm and statistics calculations can be performed only on the face region that is located at driver's seat of the vehicle. Further, the windows can be directly to the left and right of the face region detected by the face detection algorithm, and the skin pixels in the windows can correspond to a hand of the driver of the vehicle, in the image. In some cases, the hand can be that of a passenger sitting behind or otherwise in proximity to the driver.

In 535, the processing can determine whether the skin pixel count in the side windows is greater than a hand skin pixel threshold. If the skin pixel count does not exceed the threshold, then processing can proceed to 555 in which processing can end, repeat, or return to any of the previous steps. In contrast, if the skin pixel count exceeds (or meets) the threshold, then the processing module or other logic can deem the existence of a hand next to the individual's face, and processing can proceed to 540 in which statistics associated with cell phone pixels in the window on the same side of the face where the hand pixels were detected, can be calculated. For example, if the hand pixels were detected, in 530, on the left side of the face, then the left window can be analyzed for cell phone pixels.

In 545, the processing can determine whether the cell phone pixel count in the appropriate side window is greater than a cell phone pixel threshold. If the cell phone pixel count does not exceed the threshold, then processing can proceed to 555 in which processing can end, repeat, or return to any of the previous steps. In contrast, if the cell phone pixel count exceeds (or meets) the threshold, then processing can proceed to 550 in which the processing module or other logic can deem the existence of cell phone usage by the individual operating the vehicle. In 555, the processing can end, repeat, or return to any of the previous steps.

Figure 6:
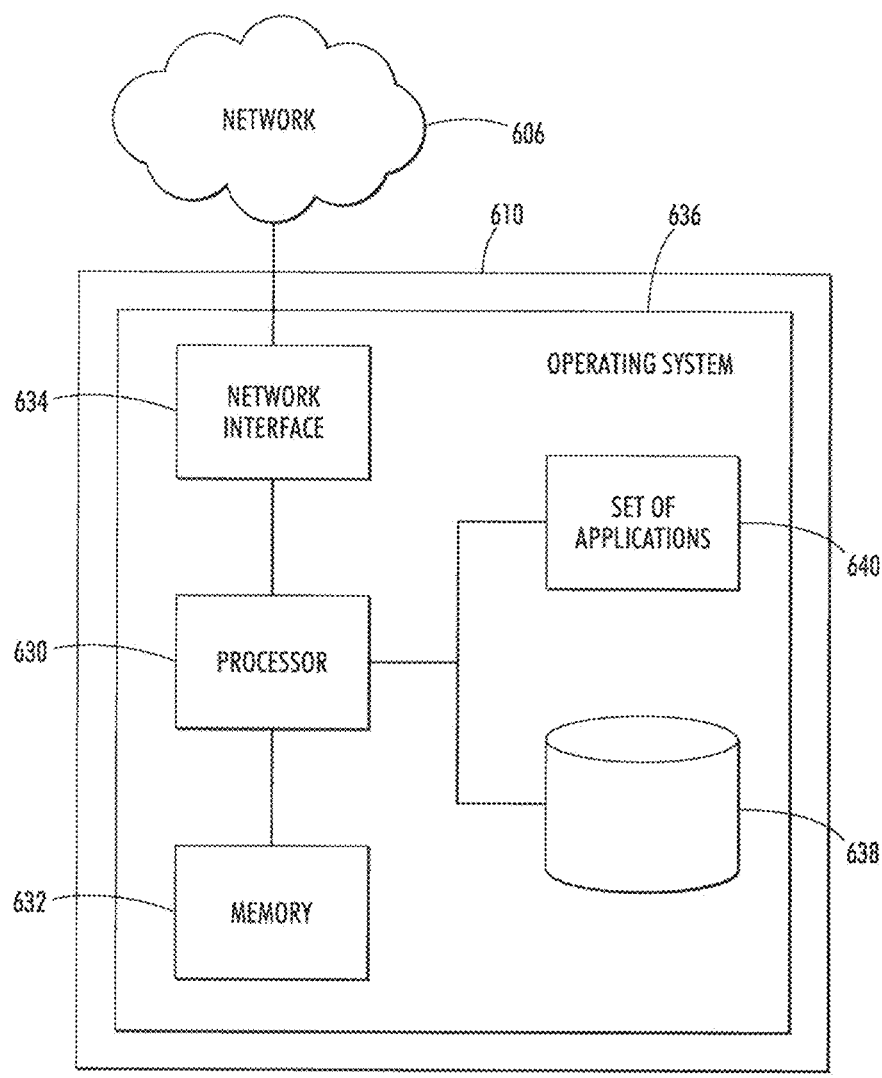
FIG. 6 illustrates a hardware diagram in accordance with another embodiment.

FIG. 6 illustrates an exemplary diagram of hardware and other resources that can be incorporated with processing and logic associated with the present embodiments. As shown in FIG. 6, a server 610 can be configured to communicate with a network 606. In embodiments as shown, the server 610 can comprise a processor 630 communicating with memory 632, such as electronic random access memory, or other forms of transitory or non-transitory computer readable storage mediums, operating under control of or in conjunction with an operating system 636. The operating system 636 can be any commercial, open-source, or proprietary operating system or platform. The processor 630 can communicate with a database 638, such as a database stored on a local hard drive. While illustrated as a local database in the server 610, the database 638 can be separate from the server 610.

The processor 630 can further communicate with a network interface 634, such as an Ethernet or wireless data connection, which in turn communicates with the network 606, such as the Internet or other public or private networks. The processor 630 can also communicate with the database 638 or any applications 640, such as applications associated with the processing center 125, to execute control logic and perform data processing, as described herein.

While FIG. 6 illustrates the server 610 as a standalone system comprising a combination of hardware and software, the server 610 can also be implemented as a software application or program capable of being executed by a conventional computer platform. For example, it should be understood that the components of the server 610 can be implemented on user PCs or other hardware such that the user PCs can communicate directly with the database 638. Likewise, the server 610 can also be implemented as a software module or program module capable of being incorporated in other software applications and programs. In either case, the server 610 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
    processing, by a processor, data associated with an image or a video of an individual operating a vehicle, wherein the processing comprises:
        analyzing the data to identify skin pixels and cell phone pixels within the image or the video based on a set of material characteristics;
        performing a facial detection technique on the data to identify a facial region comprising a portion of the skin pixels;
        identifying a region of interest (ROI) in a proximity to the facial region;
        analyzing an additional portion of the skin pixels and the cell phone pixels within the ROI; and
        determining whether the individual is using a cell phone based on the analysis of the additional portion of the skin pixels and the cell phone pixels;
    wherein:
        the image is a multi-spectral image captured using a plurality of wavelengths;
        the material characteristics comprise:
            material reflectance of skin at the plurality of wavelengths, and
            material reflectance of the cell phone at the plurality of wavelengths.

2. The method of claim 1, wherein the data is analyzed according to a principal component analysis (PCA) technique.

3. The method of claim 1, wherein determining whether the individual is using the cell phone comprises:
    determining that a number of pixels in the additional portion of the skin pixels within the region of interest (ROI) exceeds a first threshold number of pixels;
    determining that a number of the cell phone pixels within the ROI exceeds a second threshold number of pixels; and deeming that the individual is using the cell phone based on the determinations.

4. The method of claim 1, wherein determining whether the individual is using the cell phone comprises:
  determining that a number of pixels in the additional portion of the skin pixels within the region of interest (ROI) exceeds a first threshold number of pixels;
  determining that a number of the cell phone pixels within the ROI does not exceed a second threshold number of pixels; and
  deeming that the individual is not using the cell phone based on the determinations.

5. The method of claim 1, wherein the processing further comprises:
  analyzing additional images of the multi-spectral image; and
  determining a confidence level of the usage of the cell phone based on the analysis of the additional images.

6. The method of claim 1, wherein the region of interest (ROI) is adjacent to the facial region.

7. The method of claim 1, wherein the additional portion of the skin pixels comprises hand pixels.

8. The method of claim 1, wherein:
  the skin pixels in the ROI comprises a skin pixel blob;
  the cell phone pixels in the ROI comprises a cell phone pixel blob;
  the determining comprises: determining that the individual is operating the cell phone based on the estimating; and
  the processing further comprises issuing an alert based on the determining that the individual is operating the cell phone.

9. A system for processing data, the system comprising:
  a capture device configured to capture data comprising an image or a video of an individual operating a vehicle; and
  a processor coupled to the capture device and configured to perform actions comprising:
    processing the data, wherein the processing comprises:
      analyzing the data to identify skin pixels and cell phone pixels within the image or the video based on a set of material characteristics;
      performing a facial detection technique on the data to identify a facial region comprising a portion of the skin pixels;
      identifying a region of interest (ROI) in a proximity to the facial region;
      analyzing an additional portion of the skin pixels and the cell phone pixels within the ROI; and
      determining whether the individual is using a cell phone based on the analysis of the additional portion of the skin pixels and the cell phone pixels;
  wherein:
    the image is a multi-spectral image captured using a plurality of wavelengths;
    the material characteristics comprise:
      material reflectance of skin at the plurality of wavelengths, and
      material reflectance of the cell phone at the plurality of wavelengths.

10. The system of claim 9, wherein the data is analyzed according to a principal component analysis (PCA) technique.

11. The system of claim 9, wherein determining whether the individual is using the cell phone comprises:
  determining that a number of pixels in the additional portion of the skin pixels within the region of interest (ROI) exceeds a first threshold number of pixels;
  determining that a number of the cell phone pixels within the ROI exceeds a second threshold number of pixels; and
  deeming that the individual is using the cell phone based on the determinations.

12. The system of claim 9, wherein determining whether the individual is using the cell phone comprises:
  determining that a number of pixels in the additional portion of the skin pixels within the region of interest (ROI) exceeds a first threshold number of pixels;
  determining that a number of the cell phone pixels within the ROI does not exceed a second threshold number of pixels; and
  deeming that the individual is not using the cell phone based on the determinations.

13. The system of claim 9, wherein the processing further comprises:
  analyzing additional images of the multi-spectral image; and
  determining a confidence level of the usage of the cell phone based on the analysis of the additional images.

14. The system of claim 9, wherein the region of interest (ROI) is adjacent to the facial region.

15. The system of claim 9, wherein the additional portion of the skin pixels comprises hand pixels.

16. The system of claim 9, wherein:
  the skin pixels in the ROI comprises a skin pixel blob;
  the cell phone pixels in the ROI comprises a cell phone pixel blob;
  the determining comprises:
    estimating a relative position of the skin pixel blob and the cell phone pixel blob in relation to the face region; and
    determining that the individual is operating the cell phone based on the estimating; and
  the processing further comprises issuing an alert based on the determining that the individual is operating the cell phone.

* * * * *